United States Patent [19]

McCartney

[11] Patent Number: 5,657,105
[45] Date of Patent: Aug. 12, 1997

[54] MULTI-DOMAIN LIQUID CRYSTAL DISPLAYS

[75] Inventor: Richard I. McCartney, Scottsdale, Ariz.

[73] Assignee: Honeywell Inc., Minneapolis, Minn.

[21] Appl. No.: 695,952

[22] Filed: Aug. 13, 1996

Related U.S. Application Data

[63] Continuation of Ser. No. 178,715, Jan. 10, 1994, abandoned.
[51] Int. Cl.⁶ .................. G02F 1/1333; G02F 1/1335; G02F 1/1343
[52] U.S. Cl. .................. 349/157; 349/106; 349/108; 349/124; 349/132; 349/143; 349/144
[58] Field of Search .................. 359/68, 76, 78, 359/95; 349/106, 108, 124, 132, 143, 144, 157

[56] References Cited

U.S. PATENT DOCUMENTS 5,032,009  7/1991  Gibbons et al. .................. 359/76
5,353,138  10/1994  Van Winsum .................. 359/68

FOREIGN PATENT DOCUMENTS

| 4092218 | 8/1981 | Japan | 359/76 |
| 0095218 | 8/1981 | Japan | 359/76 |
| 120218 | 11/1982 | Japan | 359/76 |
| 0120218 | 7/1983 | Japan | 359/76 |
| 0525477 | 7/1992 | WIPO | C08F 2/46 |
| 0525478 | 7/1992 | WIPO | G02F 1/1337 |

OTHER PUBLICATIONS

Letters to Nature, vol. 351, May 1991 London GB, pp. 49–50—Author: W.M. Gibson et al.

*Primary Examiner*—Wael Fahmy
*Assistant Examiner*—Fetsum Abraham
*Attorney, Agent, or Firm*—C. J. Ungemach; R. E. Champion

[57] ABSTRACT

A method for fabricating a multi-domain liquid crystal display wherein adjacent areas of the display are oriented in different direction by coating the substrate with a polymer and exposing a first set of areas to ultraviolet/light from a source polarized in a first direction and then exposing a second set of areas to ultraviolet light from a source polarized in a second direction.

5 Claims, 1 Drawing Sheet

MULTI-DOMAIN LIQUID CRYSTAL DISPLAYS

This application is a continuation, of application Ser. No. 08/178,715 filed Jan. 10, 1994 now abandoned.

BACKGROUND OF THE INVENTION

1. Field of the Invention

The present invention relates to liquid crystal displays and more particularly to the technique of manufacturing a multi-domain liquid crystal display utilizing a photoactivated polymer as an alignment layer for the practice of complimentary domains.

2. Description of the Prior Art

Multi-domain liquid crystal displays are well known in the art. In such displays each pixel or dot (the smallest area which can be independently operated) consists of two halves where one half passes light exactly as if it were 180 degrees rotated with respect to the other. This improves the viewing angle for the dot since the intensity of light passing through a dot is not symmetrical with viewing angle, that is, the peak luminance for various grey scales varies with the viewing angle and this is skewed to one side of the zero angle as the grey scale decreases. It has been found, however, that if a dot is inverted, the opposite change of intensity with viewing angle occurs. That is, intensities that peaked at say a +15 degree viewing angle would now peak at a −15 degree viewing angle. Thus if a dot is divided in half and one half is the inverse of the other, then the two curves which peak at +15 degrees and −15 degrees would merge to produce an average curve which would peak at zero degrees and would be relatively flat on both sides of zero so that the peak intensity would not change much as the eye shifted from −15 degrees to +15 degrees. The same effect is observed at all of the intensities used in creating the grey scale values and a much better display is produced.

All present LCD matrix displays utilize a technique known as "rubbing" on the upper and lower substrate which acts to align the liquid molecules near the surface in a preferred direction. Usually, the upper substrate is "rubbed" in a first direction and the lower substrate is "rubbed" in a direction 90 degrees from the first direction. However, to create two differently directed domains on a single surface, as is required for increasing the viewing angle as above described, the "rubbing" process is difficult to use. While it would be desirable to "rub" each adjacent dot in a different direction, such a procedure is substantially impossible. "Rubbing" has been used to create two domains however by rubbing in one direction over one half of the individual dots in a row and in the other direction over the remaining half. This then produces dots which have two regions which are "rubbed" in opposite directions and this produces the desired effect. This process is described in a paper intitled "Wide-View-Angle Improvements for AMLCDS", published in the Society for Information Display International Symposium Digest of Technical Papers Volume XXIV on pages 266–268.

The two way "rubbing" process is still rather complex and difficult to use because it requires a first "rubbing" in one direction followed by a masking off of half pixels, an etching of the unmasked portions, re-"rubbing" in the other direction over the other half pixels and then removing the masks. Not only is this time consuming and expensive, but a border area between the two "rubbings" results in loss of active area.

In an article entitled "Surface-Induced Parallel Alignment of Liquid Crystals My Linearly Polymerized Photopolymers" printed in the Journal of Applied Physics, Volume 31, (1992) Pages 2155–2164, a technique of photopolymerization of polymer-coated substrate with linearly polarized light is shown to induce an anisotropic, uniaxial orientation of polymer molecules. The resulting anisotropic dispersive surface interaction forces are shown to align adjacent liquid crystals parallel. This produces the same effect as "rubbing" and it is suggested that the technique could be used on the upper and lower substrate of the liquid crystal display or, as the Applied Physics article states " . . . to generate homogeneous LC-director pattern with different azimuthal director angles on the same substrate requiring no mechanical treatment.".

BRIEF DESCRIPTION OF THE INVENTION

The present invention utilizes the photopolymerization techniques described in the Applied Physics article above to produce a multi-domain LCD by photopolymerization of each dot separately in the desired directions.

DETAILED DESCRIPTION OF THE PREFERRED METHOD

Figure 1:
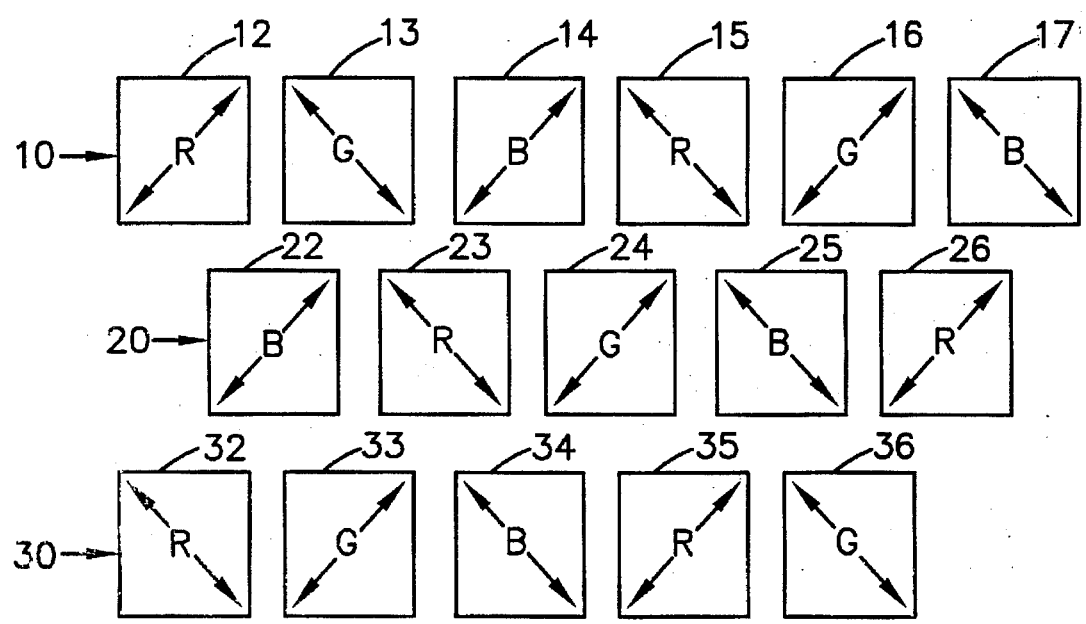
FIG. 1 shows a top view of a portion of an LCD display.

In FIG. 1, a first row of LCD dots 10 is shown containing 6 dots 12, 13, 14, 15, 16 and 17 with labels "R", "G" and "B" representing the colors red, green and blue respectively. A second row 20 is shown offset from row 10 and containing 5 dots 22, 23, 24, 25 and 26 also with labels "R" "G" and "B". A third row 30 is shown offset from row 12 and containing 5 dots 32, 33, 34, 35 and 36 also with labels "R", "G" and "B". The number of dots and rows is, of course, only for explanation purposes and in actual practice, a large number of dots would be found in a large number of rows in a much larger display.

The orientation shown in FIG. 1 is chosen so that groupings of red, green and blue are triangular to produce a minimum area for color mixing. It should be understood that other orientations are possible.

Each dot is shown to be oriented in a direction shown by an arrow therein and it will be noted that all adjacent dots in each row are oriented in a direction which is 90 degrees displaced from both neighbors. It will also be noted that no two dots are adjacent the same color dot in any row or between rows.

To produce the matrix shown in FIG. 1, the substrate which is over the liquid crystal units is first coated, for example by "spin coating", with a suitable polymer such as PVMC described in the Applied Research article. This polymer is a classic photoresist and accordingly, when exposed to polarized ultra violet light, will align in a first preferred direction. Accordingly, as a second step, I provide a first mask with apertures therein at the location of each dot which I desire to be oriented in the first direction. I then expose the substrate to the ultra violet light of the first polarization which results in those areas below the apertures to be exposed while the remaining areas of the substrate remain unexposed.

After the first areas are set in the first desired orientation, I provide a second mask with apertures therein at positions where I desire the second orientation to be. I then expose the substrate and mask to ultra violet light of the second polarization which then exposes the second areas to set them in the second desired orientation.

When both areas are set in the desired orientations, the substrate is ready for use with the LCD. Light of varying intensities and colors will then be observed in both the direct and inverse curves to produce an average curve which is desirably flat and peaked around zero degrees viewing angle.

It is therefore seen that I have provided a method of fabricating a multi-domain liquid crystal display without the time consuming and complex steps of the prior art, without the unusable boundary area which occurs when using the half dot "rubbing" method of the prior art. Furthermore, each individual dot may separately be oriented in any desired direction which was not possible with the prior art. Many alterations will occur to those skilled in the art. For example, the orientation of the dots in the display described herein may be different, the directions of preferred orientation may be changed and the use of monochrome or other color arrangement may be employed without departing from the spirit and scope of the present invention. While individual adjacent dots have been shown to have different orientations, the present invention may be used to have different orientations on half dots as in the old "rubbing" method or other areas of a substrate may be differently oriented to acheive the multi-domain wide viewing angle advantages. Also, instead of two different alignment directions, three or more areas may each have different orientations. For example, using polarizations 120 degrees apart could be used to produce three different alignments (etc). Individual dots need not necessarily be divided in two equal halves but may be divided by ⅓ and ⅔, for example, if desired. Also, the specific photopolymer PVMC used in the Applied Physics article is only one of several useful polymers that may be used. I therefore do not wish to be limited to the descriptions used in connection with the preferred embodiments but only intend to be limited by the scope of the appended claims.

I claim:

1. A liquid crystal display having a plurality of dots arranged in a plurality of rows with a first subset of the plurality of dots being aligned in a first direction and a second subset of the plurality of dots being aligned in a second direction;

a first row of the plurality of dots containing members from the first and second subsets and arranged so that no members from the same subset are adjacent; and a second row of the plurality of dots, offset from the first to provide dots arranged in a triangular configuration to produce a minimum area for color mixing, containing members from the first and second subsets and arranged so that no members from the same subset are adjacent.

2. Apparatus according to claim 1 wherein the first and second directions are ninety degrees apart.

3. A liquid crystal display having a substrate with a plurality of dots arranged in a plurality of rows with a first subset of the plurality of dots physically positioned in a first direction parallel to the substrate and a second subset of the plurality of dots physically positioned in a second direction parallel to the substrate;

a first row of the plurality of dots containing members from the first and second subsets and arranged so that no members from the same subset are adjacent; and a second row of the plurality of dots containing members from the first and second subsets and arranged so that no members from the same subset are adjacent.

4. Apparatus according to claim 3 wherein the second row is offset from the first to provide dots arranged in a triangular configuration to produce a minimum area for color mixing.

5. Apparatus according to claim 3 wherein the first and second directions are ninety degrees apart.

* * * * *